United States Patent Office 3,782,998
Patented Jan. 1, 1974

---

3,782,998
METHOD OF INSULATING COLD SUBSTRATES AND THE INSULATED SUBSTRATES
Albert C. Condo, Newtown Square, Pa., and Clinton A. Reph, Amherst, Ohio, assignors to Atlantic Richfield Company, New York, N.Y.
No Drawing. Filed Nov. 30, 1971, Ser. No. 203,424
Int. Cl. B29d 27/00; B32b 27/40
U.S. Cl. 117—66        19 Claims

ABSTRACT OF THE DISCLOSURE

Method of insulating cold substrates by providing a first high density foam layer on the substrate which in turn provides a warm surface for depositing a second insulating layer of polyurethane foam on the substrate. In a further embodiment, the opposite surface of the substrate to that being insulated is temporarily insulated with a non-foam insulating material prior to applying the first layer to the substrate to slow dissipation of heat through the substrate.

BACKGROUND OF THE INVENTION

Heretofore workers in the art have come upon a difficult problem in applying polyurethane foams having good insulation properties to substrates which are reasonably cold; that is, below about 70°° F., and/or which may offer too inefficient a heat sink or wherein the air temperature itself is below about 70° F. These foams are applied to the substrate to be insulated in an uncured state; generally by allowing polyols and isocyanates as liquid components to intermix and react with each other in the presence of a catalyst on the surface to be insulated, and allowed to cure in situ; forming a bond with the substrate as it cures. If the environment it too cold for the foams to properly cure, they can be too dense and lack adhering properties while impairing the thermal insulating properties which are attainable under proper cure conditions. This problem has interfered with the use of high quality insulation type foams in Arctic and other cryogenic environments where it is necessary to provide in situ insulation. Particular problem areas are in the insulation of steel or other metal buildings surrounded by a cold medium, for regardless of how warm the inside of said biulding may become, the metal sides rapidly dissipate the heat to the cold outerside and said sides or substrates remain relatively cold and act as a condensing surface for moisture on the warm side which acts to chemically interfere with the foam curing reaction and adhesion.

Foams have been developed which will cure at relatively low temperatures. This has generally been accomplished by the addition of extra catalyst which causes the resultant foams to be somewhat more dense, and having a larger propertion of their cells being open. The foams produced in this manner are less effective in their insulating properties on a pound for pound basis when compared with the less dense foams having a larger proportion of their cells being closed and consequently economically less desirable.

Evaluation of cold curing foams compared to those requiring a higher temperature for curing indicates that in general both types will pass ASTM D–1692 flammibility tests as "self-extinguishing"; however, the cold cured foams take longer to self-extinguish. With respect to ASTM E–84 test standards for flame spread rate, the cold curing foams will generally not pass. Special formulas of the normally curing foams are available which have desired flame spread rate indexes below 25.

SUMMARY OF THE INVENTION

It is an object of this invention to insulate cold substrates with polyurethane foams.

Another object of this invention is to provide a means whereby polyurethane foam insulation having fire retardant properties can be applied to substrates that are too cold to property cure the foam if directly applied.

A further object of this invention is to prepare cold substrates to accept polyurethane foams which are receptive to intumescent finish coatings.

A further object of this invention is to develop a process for in situ application of polyurethane foam insulation systems to cold metallic substrates which are both fire retardant and receptive to intumescent coatings.

THE INVENTION

The aforementioned objects and the advantages of the invention will become more apparent from the following description of the procedures and the products obtained therefrom and the appended claims which particularly point out and distinctly claim the subject matter of the invention.

As a solution to the aforementioned problems in applying insulating quality polyurethane foam composition to cold substrates which would not of their own accord support proper curing of the polyurethane foam, it has been found that primer coatings in the form of "cold curing foams" can be applied to substrates to provide a relatively warm substrate for application of the insulating foams. These cold curing foams are generally formulations of polyols and isocyanates having a higher percentage of catalyst in the composition which allows said foams to cure upon substrates at temperatures below about 70° F.; and in fact, commercial formulations of these foams are available which will cure when the environment is actually below the freezing point. These cold curing foams are generally characterized by having a high density and fast cure rate such that the exothermic heat of reaction is immediately set into operation to provide sufficient heat for self-curing. While most polyol-isocyanate compositions include a refrigerant which serves as a blowing agent, it has been found advantageous to use Freon 12 or a commercial equivalent when temperatures are below about 75° F. This is a more volatile blowing agent than those used under warmer conditions. The volume percent of the refrigerant needed to initiate the reaction between the polyol and isocyanate generally would be up to about 5 percent by volume and is known in the art for the various temperatures and components utilized. The cold curing foams would have an overall density of 2.5 to 5 pounds per cubic foot and about 80 to 92 percent of the cells formed are closed. More preferably, the composition would be formulated so that at least 85 percent of the cells would be closed. This provides a better insulating characteristic for the primer foam. This primer coating would be applied to the substrate in a thickness of at least ¼ inch and not more than 1¼ inches. The thickness would vary inversely with the temperature to which the substrate is exposed.

It is known that the exothermic heat of polyurethane foams can reach temperatures of 150 to 300° F. within the body of the expanded foam during the curing stage. This heat, in addition to curing the primer coating, serves two other purposes in the present invention by providing the heat which is lost through the substrate to the environment while simultaneously heating the opposite side of said layer, this being the exposed side, to temperatures above 70° to about 100° F. By having a thickness which provides some degree of insulation, this surface temperature can normally be maintained for about 1 hour depending upon the temperature to which the substrate is exposed, and the thickness to which the primer coating is applied. For example, if the substrate temperature is above 50°, generally ¼ to ½ inch of primer foam will provide an adequate warm substrate for application of insulating foams; while at temperatures below zero, it is necessary to apply foams having a thickness of up to about 1 and ¼ inches as the primer coating. The high density foam described above adheres to metal and other nonporous substrates more readily than low density foams when applied in the same manner. Therefore, this procedure additionally provides an adhesive bonding between the insulating foams and the metal substrates which could not be obtained by direct application of low density foam even should the such foams be able to cure at the temperatures of the substrate.

While the primer foam is curing and the temperature of the surface thereof is above 70°, a second layer of insulating quality polyurethane foam can be applied in situ to said primer coating. The exothermic heat of the primer coating supports the curing of the insulating foam which will adhere to said primer coating in a satisfactory manner. Foam compositions selected for the insulating layer would normally have an overall density when cured of about 2 to 3 pounds per cubic foot and have a closed cell content averaging about 95 percent.

The foams, when cured, should pass the ASTM-D-1692-67T flammability test and be considered self-extinguishing as well as being flame retardant. While these criteria would not be necessary for obtaining the insulation results desired, there are building codes which require that these types of requirements be met. The invention is primarily directed to the insulating of structures in Arctic and/or other severe cryogenic environments; therefore, fire proofing is an important consideration. The insulating foam would generally be applied to the primer coating to a thickness of about 1 inch to 4 inches. Again, the thickness of the final product would be determined by those skilled in the art and depend upon the environment and the purposes for which the insulation is being applied. Most low density foams are receptive to intumescent finish coatings, and this should be another requirement in selecting the insulating foam, as this provides further means of fire protection for the insulating body.

By way of definition, "fire resistance" is defined as the "property of a material to withstand fire or give protection from it as applied to elements of building." It is characterized by the ability to confine a fire or to continue to perform a given structural formation or bond in the presence of a fire. Fire retardancy is defined as having or providing comparatively low flammability or flame spread properties. "Intumescent coatings" are fire retardant coatings formulated to include compounds which intumesce when the temperature is raised beyond a certain point. The resulting film caused by the release of water vapor or other gas acts as an insulating blanket to minimize further heat transfer. Many intumescent paints and coatings are commercially available and the present application is directed not toward the improvement or composition of any one in particular but rather to the use of intumescent paints in combination with polyurethane foam to provide a fire resistant, fire retardant insulating material suitable for use on the interior of building walls.

As a further embodiment of the application, we have found that when heat passes through the substrate too rapidly, condensation can form on the internal surface of the primer coating of foam. This is particularly evident when temperatures are below freezing, such as in Arctic environments. In order to slow the heat loss through the substrate, we have found that it is advantageous to temporarily insulate the external side of said substrate with a non-foaming type insulation which can be affixed to the sides of the substrate in any desired manner. We have found that a particularly effective means of temporarily insulating the external sides is by using 2 to 3 inch thicknesses of fiber glass insulation which is held in place by large canvasses which additionally serve as a windbreak to slow dissipation of heat. Using this prescribed procedure, we have successfully insulated buildings when the outside temperature has been below —20° F. The use of the canvas alone has been successful under less severe conditions.

As another embodiment of this invention, we have found that polystyrene foam can be incorporated in the polyurethane foam to obtain a less dense foam than could be obtained using the urethane alone. The polystyrene is a thermoplastic which contains a blowing agent in the pre-expanded or nonexpanded form. When subjected to heat such as the heat generated by the curing polyurethane, the gel will tend to heat up into a melt stage and simultaneously release the blowing agent which causes a frothing to occur as it is transformed into the plastic state. The resulting foam sets on cooling.

The methods by which polyurethane liquid components and the pre-expanded polystyrene beads are mixed can be varied. For example, the pre-expanded beads can be ground to a fine powder and dispersed in either the isocyanate or the polyol component for the polyurethane. This results in intimate mixing of the polystyrene with the two components of the polyurethane as they are applied to the surface to be insulated. Another method is to lay down a rather thin layer of polyurethane to which pre-expanded beads are applied during the tacky stage followed by a second application of the polyurethane liquid so as to cover the polystyrene beads. Other methods of including polystyrene beads within the polyurethane mixture are considered equivalent of the above described methods, and it is sufficient to note that the polystyrene would generally be applied in small amounts in order that the heat produced by the curing polyurethane will be sufficient to cause the polystyrene to expand with the urethane.

From a technical standpoint, the superior water repellent properties of polystyrene tend to enhance the resistance of the resulting product to moisture adsorption, therefore providing an improvement over the normal characteristic of polyurethane. The low cost of polystyrene foam reduces the overall material costs per unit of the resulting foam product. The chemical resistance of the polyurethane is not effected as the outer skin of the foam would be polyurethane itself. This is because the heat on the outer skin is not sufficient to cause the polystyrene foam particles to expand. The finished product could be described as a continuous polyurethane matrix having a discontinuous phase of polystyrene beads therein.

In order to better understand the present application, experimental insulation of metal structures was done when the outer side of said structures were exposed to Arctic environments. The primer coating was a commercially available polyurethane type resin designed for low temperature applications. The viscosity at 65° F. was 250 cps. and the density was 10.3 pounds per gallon. In an environment of 80° F. there was a set time of 14 seconds while at 65° F. the set time was 21 seconds. This composition yielded a foam having a core density of 2.1 to 2.4 pounds per cubic foot with an overall density of 2.6 to 2.9 pounds per cubic foot. Approximately 90 percent of the cells were closed. The insulating layer of polyurethane foam had a viscosity of 350 cps. at 65° F. with a density of about 10 pounds per gallon. At 95° F. at a set time of six seconds, at 80° F. at nine seconds, and at 65° F. 14 seconds. The overall density of the foam produced was 2.2 to 2.6 pounds per cubic foot.

EXAMPLE I

A metal structure exposed on its outer side to an environment of about 55° F. and having an internal air temperature of about 70° F. was sprayed on its internal surface with a coating of the normal curing insulating polyurethane foam. The foam was applied to the extent that through proper curing, a 2 inch layer of the foam would have existed. Due to the rapid dissipation of heat through the metal substrate to the outside air, curing took place and the spray merely dripped off the surface.

EXAMPLE II

Under similar circumstances to those described in Example I, a spray of the low temperature primer urethane foam was applied to the metal substrate such that a layer ½ inch thick, if proper curing took place, would be present. The foam cured and a satisfactory bond between the foam and the metal substrate occurred.

EXAMPLE III

With outside temperatures at about 40° F., it was determined that a combination of the two foams should be applied in order to prepare a suitable insulation coating on the internal surface of the metal building described in Examples I and II. A ½ inch thick layer of the low temperature primer polyurethane foam was applied to the substrate; and while this was curing, a 1½ inch layer of the normal curing insulation foam was applied. Upon curing, it was noted that cracks appeared in the insulating layer of the foam. An investigation into the causes for the poor adherence between the two layers and the cracking was conducted, and it was determined that the exothermic heat of reaction of the low temperature curing foam was dissipated rapidly through the outer walls and caused moisture to condense on the internal surface of the layer. This moisture tended to react with the isocyanate at the interface where the normal curing foam would adhere to the low temperature foam and this reaction killed the adhesion between the layers. The cracks appeared where adhesion failed.

EXAMPLE IV

Under conditions wherein the outside temperature ranged between 15 and 30° F. with high winds, the outer side of the building to be insulated was temporarily covered with a canvas tarpaulin to slow dissipation of the heat in the metal skin. A ½ inch layer of the low temperature primer foam was applied followed thereafter during its cure stage by an application of 1¾ inches to 2 inches of a normal curing urethane foam. As this insulating layer was curing, it became apparent that cracks were developing in several sections. It was determined that the heat was still flowing too rapidly through the outer metal substrate; and therefore, condensation was forming on the internal surface of the low temperature curing foam. While the curing temperature was sufficient to allow the normal insulating layer to cure, an examination at the interface showed that ice crystals had actually formed in some areas and that the adhesion was poor between the two layers for the same reason as described in Example III.

EXAMPLE V

Under conditions wherein the outside temperature was about 25° F., a ⅝ inch layer of low temperature curing primer foam was applied to a substrate followed by a 2 inch layer of normal curing foam to serve as insulation. The canvas tarpaulin was still applied to the outer side of the metal substrate in order to deter the rapid dissipation of heat through the substrate. An examination of the finished product indicated that the low temperature foam had formed a very good bond with the metal substrate and that the insulating layer had formed a good bond with the low temperature foam. In this manner a satisfactory insulating material was applied to the inner surface of the metal substrate.

EXAMPLE VI

With an outside temperature of 55° F. and the canvas tarpaulin in place, it was determined that a ¼ inch layer of the low temperature foam would support proper curing of the normal curing foam and provide a satisfactory adhesion bond at the interface.

EXAMPLE VII

With outside temperatures dropping to −20° F., a 3 inch thickness of fiber glass insulation was temporarily placed on the outer side of a metal structure and this was covered with a tarpaulin to further reduce wind and environmental effects. A 1¼ inch layer of primer foam was applied to the inner surface; and during the cure period, a 3 inch layer of insulating foam was applied thereon. An examination of the results indicated a good bond between the metal and the primer, and a good bond at the interface between the layers of foam.

EXAMPLE VIII

Further experimentation with various thicknesses of the foams at different temperatures led to the following minimum thicknesses required for proper bonding of the primer foam to the substrate and proper bonding at the interface with the insulating foam layer.

| Temperature, °F. | | Minimum thickness, in. |
|---|---|---|
| 50 to 70 | (No protection to outer surface) | ½ |
| 50 to 70 | Temporary insulation applied to outer surface. | ¼ |
| 20 to 50 | No protection | ¾ |
| 20 to 50 | Temporary insulation applied to outer surface. | ½ |
| −30 to 20 | do | 1 |

EXAMPLE IX

Under the conditions described in Example VII, the insulating procedures can be modified in that pre-expanded bead polystyrene in powder form is mixed with the isocyanate prior to its being applied as a component of the insulating layer of polyurethane. An examination of the cured product reveals that the exothermic heat given off by the urethane is sufficient to expand the styrene beads in situ.

EXAMPLE X

Under the conditions described in Example VII, the insulating procedures can be modified in that pre-expanded bead polystyrene in powder form can be mixed with the polyol prior to its being applied as a component of the insulating layer of polyurethane. An examination of the cured product reveals that the exothermic heat given off by the urethane is sufficient to expand the styrene beads in situ.

We claim:
1. A polyurethane foam insulation system formed in situ on a substrate having a temperature of −30° F. to 70° F. comprising a first layer of polyurethane foam having an overall density of 2½ to 5 lbs. per cubic foot and a second layer of polyurethane foam securely bonded to said first layer, having fire retardant properties and being receptive to intumescent coatings and having an overall density of 2 to 3 lbs. per cubic foot.

2. The system of claim 1 wherein said first layer is at least 0.25 inch and not more than 1.25 inches in thickness.

3. The system of claim 2 wherein said first layer has an average closed cell content of 80 to 92 percent.

4. The system of claim 3 wherein the average closed cell content of said first layer is between 85 and 92 percent.

5. The system of claim 1 wherein said second layer is at least 1.0 inch thick.

6. The system of claim 1 wherein said second layer is between 1.5 and 4.0 inches thick.

7. The system of claim 1 wherein said second layer has an average closed cell content of about 95%.

8. The process for applying in situ an insulating layer of polyurethane foam to a substrate, the temperature of which will not support proper foaming and curing of said insulating layer comprising:
   (A) applying to the substrate a first layer of polyurethane which foams and cures at the temperature of said substrate, and
   (B) applying as a second layer said insulating polyurethane foam layer to the surface of said first layer while said first layer is curing.

9. The process of claim 8 wherein the substrate is exposed to temperatures between −30 and 70° F.

10. The process of claim 8 wherein the opposite side of said substrate to that being insulated by foam is temporarily protected by a nonfoaming type insulation.

11. The process of claim 10 wherein fiber glass is used as the temporary insulation.

12. The thickness of claim 8 wherein said first layer is applied to a thickness of 0.25 to 1.25 inches.

13. The process of claim 12 wherein pre-expanded polystyrene is incorporated into said second layer.

14. A method of insulating substrates, one side of which is exposed to temperatures between −30° F. and 70° F. comprising applying a first polyurethane foam layer formulated to cure at the substrate temperature and applying a second polyurethane foam insulating layer to said first layer while the exothermic heat generated by the curing of said first layer maintains the surface upon which said second layer is applied at a temperature above about 70° F. and which is sufficient to provide a portion of the heat required for curing said second layer, said first layer being of a thickness sufficient to prevent the deposit and/or accumulation of moisture on the inside surface of said first layer prior to the substantial completion of the curing of said first layer.

15. The method of claim 14 when said first layer is applied to a thickness of 0.25 to 1.25 inches.

16. The method of claim 14 wherein the opposite side of said substrate to that being insulated by foam is temporarily protected by a nonfoaming type insulation during the application of said insulation to said substrate.

17. The process of claim 16 wherein fiber glass is used as the temporary insulation.

18. The process of claim 14 wherein said first polyurethane foam layer is applied to a thickness of 0.25 to 1.25 inches.

19. The process of claim 18 wherein said pre-expanded polystyrene is incorporated into said second polyurethane layer.

References Cited

UNITED STATES PATENTS

| Number | Date | Name | Class |
|---|---|---|---|
| 3,649,324 | 3/1972 | Payne | 117—72 X |
| 3,542,740 | 11/1970 | Pumpelly et al. | 117—161 KPX |
| 3,423,343 | 1/1969 | Barnett | 117—161 KP X |
| 3,223,576 | 12/1965 | Evans et al. | 117—161 KP X |
| 3,091,551 | 5/1963 | Robertson | 117—161 KP |
| 3,169,934 | 2/1965 | Dennett et al. | 117—104 R X |
| 2,725,271 | 11/1955 | Cunningham | 117—72 X |
| 3,279,334 | 10/1966 | Quartararo | 260—2.5 A X |
| 3,357,939 | 12/1967 | Reischl et al. | 260—2.5 A X |
| 3,619,268 | 11/1971 | Robertson | 117—161 KP X |

RALPH HUSACK, Primary Examiner

U.S. Cl. X.R.

117—72, 75, 136; 156—78; 161—159, 190